United States Patent
Cai et al.

(10) Patent No.: US 8,369,054 B2
(45) Date of Patent: Feb. 5, 2013

(54) NMOS-BASED FEEDBACK POWER-CLAMP FOR ON-CHIP ESD PROTECTION

(75) Inventors: Xiaowu Cai, Shenzhen (CN); Beiping Yan, Hong Kong (HK); Xiaoyang Du, Shenzhen (CN); Xiao Huo, Hong Kong (HK); Xiaoyong Han, Xi'an (CN); Bingyong Yan, Shenzhen (CN)

(73) Assignee: Hong Kong Applied Science and Technology Research Institute Co., Ltd., Hong Kong (HK)

( * ) Notice: Subject to any disclaimer, the term of this patent is extended or adjusted under 35 U.S.C. 154(b) by 275 days.

(21) Appl. No.: 12/795,657

(22) Filed: Jun. 8, 2010

(65) Prior Publication Data

US 2011/0299202 A1  Dec. 8, 2011

(51) Int. Cl.
*H02H 3/22* (2006.01)
(52) U.S. Cl. .......................................... 361/56; 361/111
(58) Field of Classification Search ................ 361/56, 361/111
See application file for complete search history.

(56) References Cited

U.S. PATENT DOCUMENTS

| | | | |
|---|---|---|---|
| 5,239,440 A | | 8/1993 | Merrill |
| 5,559,659 A | | 9/1996 | Strauss |
| 7,027,275 B2 | | 4/2006 | Smith |
| 7,085,113 B2 | | 8/2006 | Gauthier, Jr. et al. |
| 7,098,717 B2 * | | 8/2006 | Watt ............................. 327/313 |
| 7,423,855 B2 * | | 9/2008 | Fankhauser et al. ............ 361/56 |
| 2006/0039093 A1 * | | 2/2006 | Gauthier et al. ................ 361/56 |
| 2007/0053120 A1 | | 3/2007 | Gauthier, Jr. et al. |
| 2007/0171587 A1 * | | 7/2007 | Lee et al. ........................ 361/56 |
| 2009/0040671 A1 * | | 2/2009 | Zhang ............................. 361/56 |

FOREIGN PATENT DOCUMENTS

CN        101060754 A       4/2006

OTHER PUBLICATIONS

Sarbishaei et al., "A Transient Power Supply ESD Clamp with CMOS Thyristor Delay Element", EOS/ESD Symposium 07-402, pp. 7A3-1 to 7A3-8, Oct. 29, 2007.
Li, Guathier, & Rosenbaum, "A Compact, Timed-shutoff, MOSFET-based Power Clamp for On-chip ESD Protection", EOS/ESD 2004, Sep. 19-23, 2004. pp. 1-7.

* cited by examiner

*Primary Examiner* — Danny Nguyen
(74) *Attorney, Agent, or Firm* — Stuart T. Auvinen; gPatent LLC

(57) ABSTRACT

A power-to-ground clamp transistor provides electrostatic discharge (ESD) protection. A filter capacitor and resistor generate a filter voltage that is buffered by three stages to drive the gate of the clamp transistor. The filter capacitor is about twenty times smaller than in a conventional clamp circuit. Feedback in the circuit keeps the clamp transistor turned on after the R-C time constant of the capacitor and resistor in the filer has elapsed, allowing for a smaller capacitor to turn on the clamp transistor longer. A sub-threshold-conducting transistor in the first stage conducts only a small sub-threshold current, which extends the discharge time of the first stage. The gate of the sub-threshold-conducting transistor is driven by feedback from the second stage. A feed-forward resistor has a high resistance value to slowly raise the voltage of the second stage from the filter voltage, and thus slowly raise the gate of the sub-threshold-conducting transistor.

20 Claims, 9 Drawing Sheets

BEGINNING OF ESD EVENT

AFTER R-C TIME ELAPSES

AFTER SUB-THRESHOLD CURRENT DISCHARGE

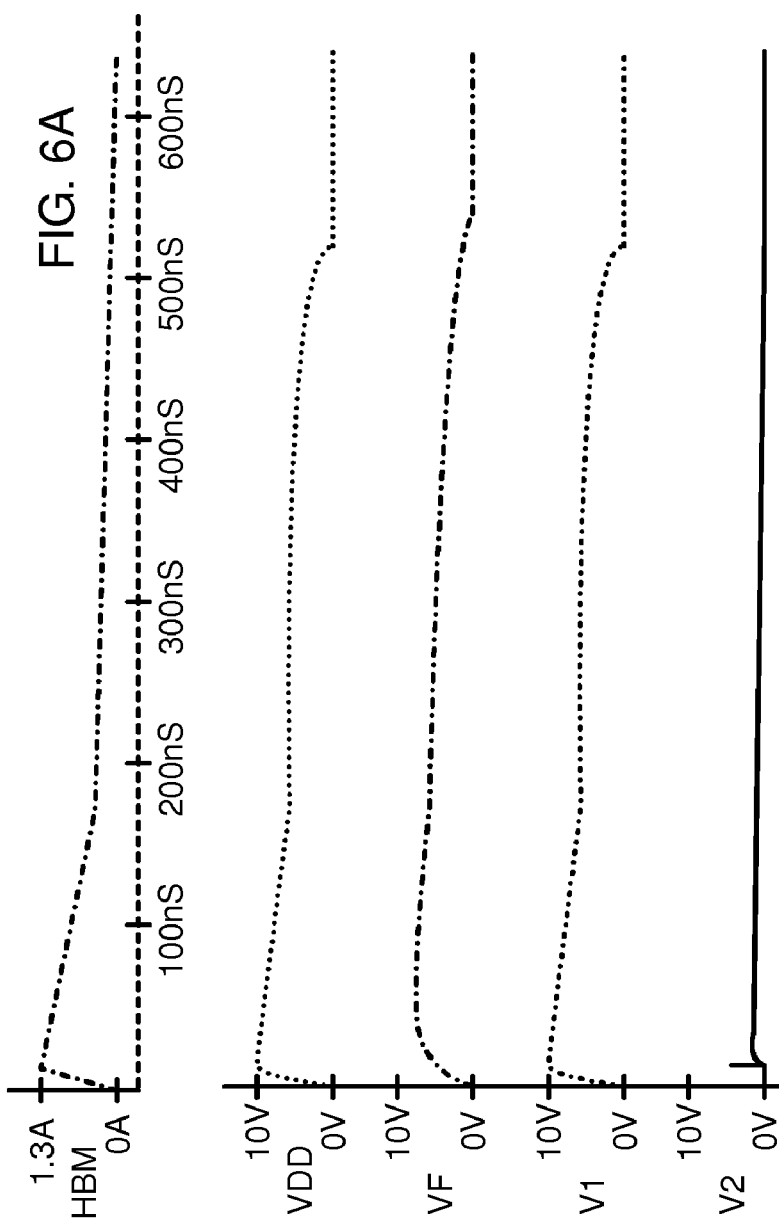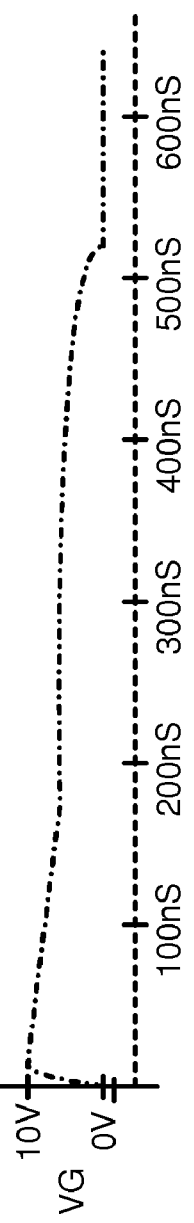

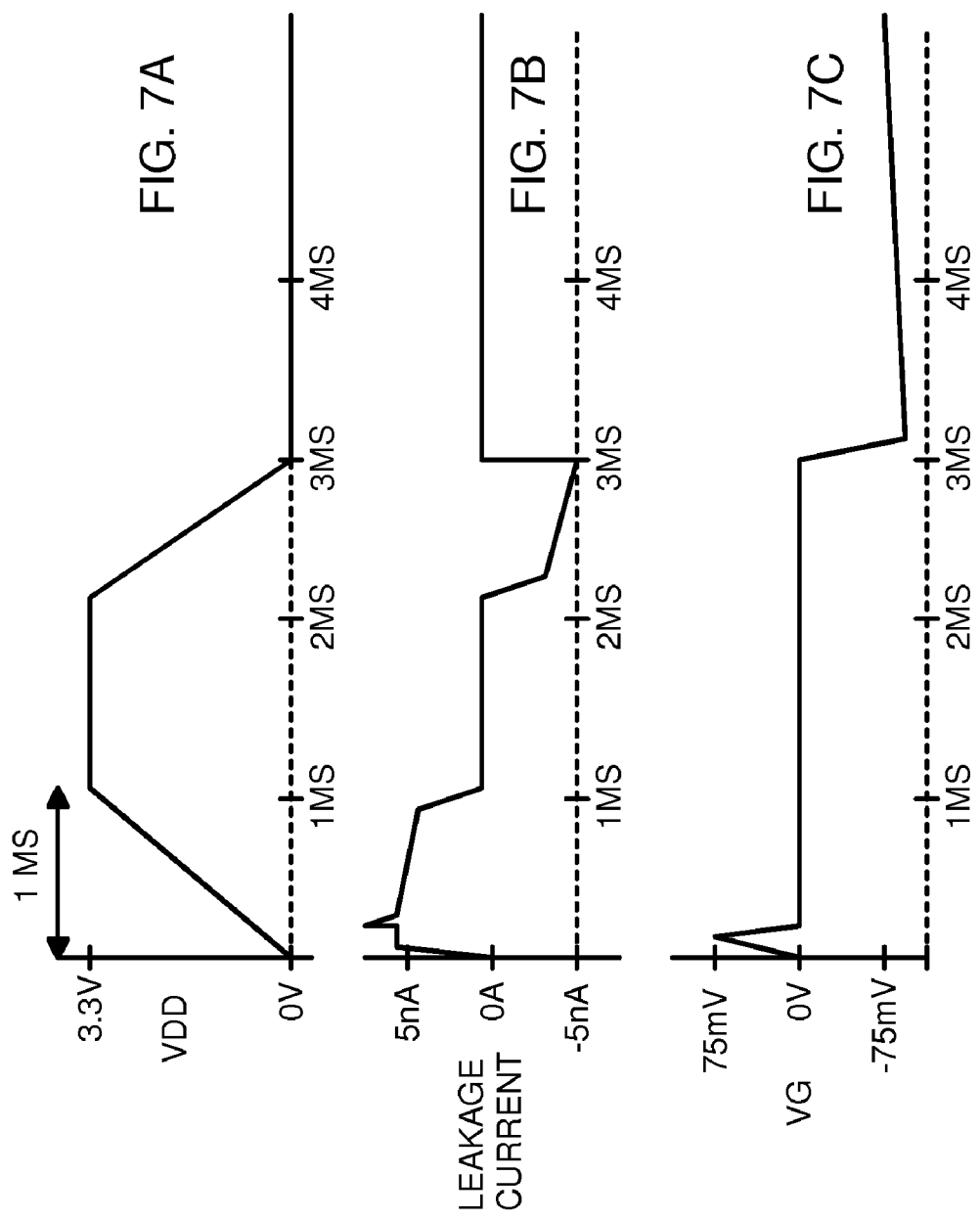

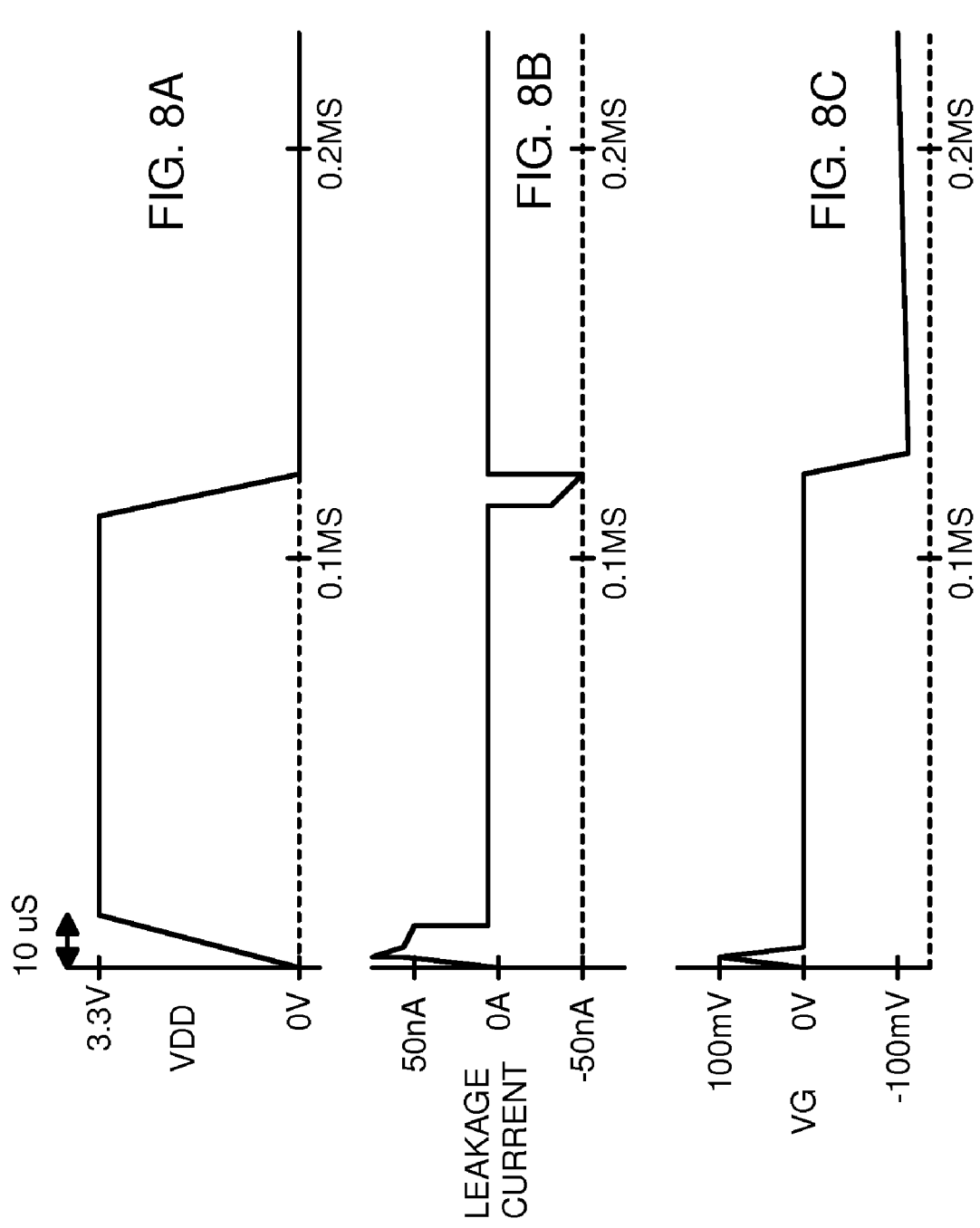

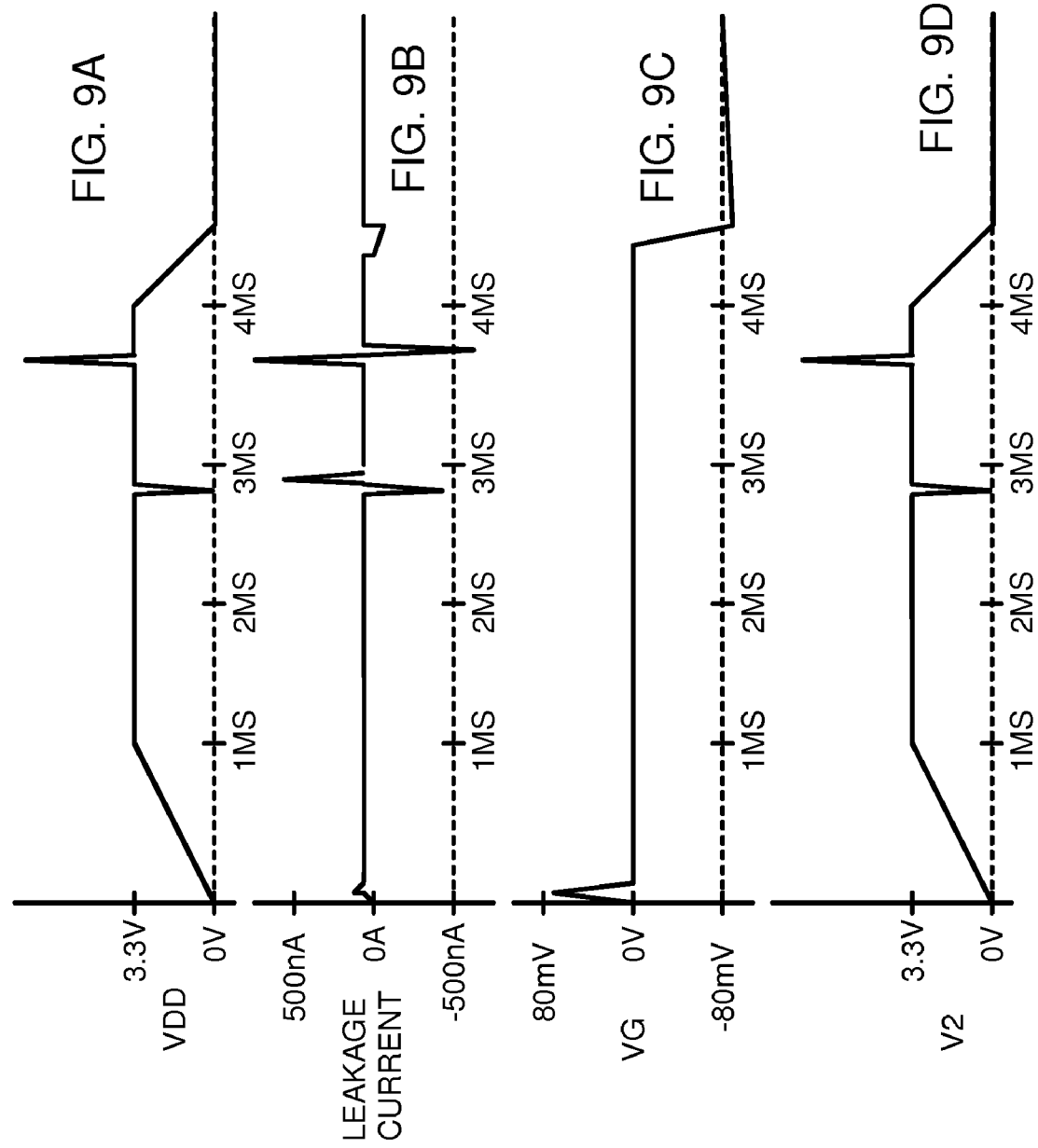

US 8,369,054 B2

NMOS-BASED FEEDBACK POWER-CLAMP FOR ON-CHIP ESD PROTECTION

FIELD OF THE INVENTION

This invention relates to electrostatic discharge (ESD) protection of semiconductor circuits, and more particularly to active feedback power-to-ground clamps.

BACKGROUND OF THE INVENTION

Semiconductor process technology produces extremely small transistors. These tiny transistors have thin oxide and insulating layers that can easily be damaged by relatively small currents with even a moderate driving force (voltage). Special care is required when a person handles these semiconductor devices.

Static electricity that normally builds up on a person can discharge across any pair of pins of a semiconductor integrated circuit (IC or chip). IC chips are routinely tested for resistance to such electrostatic discharges (ESD) using automated testers that apply a voltage across different pairs of pins of the chip. Any pair of pins may be chosen for the ESD test. The Human Body Model (HBM) is one such test.

While input and output pins were originally provided with ESD-protection circuits, the core circuitry was directly connected to the Vdd power supply and the Vss ground supply without a power clamp for ESD protection. When an ESD pulse was applied between Vdd and Vss, the large number of transistors connected to the power and ground supplies apparently reduced the current surge in any one device, thus dissipating the ESD pulse using the chip's internal transistors. Little or no damage was apparent.

However, as device sizes continued to shrink, damage began occurring when ESD pulses were applied between power and ground. The exact failure mechanism could be difficult to determine, and varied from design to design with the circuit and geometry of the integrated circuit (IC). ESD-protection circuits then were provided for power-supply pins.

ESD protection circuits with thick oxide transistors have been used. While such thick-oxide transistors are less sensitive to damage than thin-oxide transistors, the amount of current conducted is reduced. A very high gate voltage is needed to turn on the transistor since the channel is separated from the gate by the larger distance of the thick oxide. Damage to other thin-oxide transistors on the chip can occur before the thick-oxide transistor turns on. Thus the protection provided by a thick-oxide transistor is less than desired. Thin oxide transistors and lateral NPN devices have also been used. However, a large width or base-emitter area is required to conduct enough current.

Rather than use passive circuits, an active clamp may also be used. FIG. 1 shows a prior art power-to-ground ESD protection circuit with an active R-C clamp.

An R-C sensing element is formed by capacitor 22 and resistor 20. Inverters 10, 12, 14 invert the sensed voltage between capacitor 22 and resistor 20, and drive the gate of n-channel clamp transistor 18.

Under normal conditions, resistor 20 drives the input of inverter 10 high, causing a low to be driven onto the gate of n-channel clamp transistor 18, keeping it off. When the power-to-ground voltage suddenly spikes high, such as during an ESD event, capacitor 22 keeps the input of inverter 10 low for a period of time determined by the R-C time constant. The low input to inverter 10 drives the gate of n-channel clamp transistor 18 high, turning on n-channel clamp transistor 18 and shunting current from power to ground, dissipating the ESD pulse applied to the power line.

While such an active ESD-protection circuit is useful, it may be susceptible to noise, especially during power-up of the chip. If the active ESD-protection circuit triggers during power-up, excessive current may be drawn through the clamp transistor, resulting in a drop in Vdd or even Latch-up. Low-voltage supplies may be more susceptible since the Vdd ramp tends to be shallower.

After the R-C time period has elapsed, resistor 20 pulls the input to inverter 10 high, and a low is driven onto the gate of n-channel clamp transistor 18, turning it off. If the R-C value is too small, the clamp turns off too soon, before all the ESD charge can be shunted to ground through n-channel clamp transistor 18. For the HBM, the pulse width is relatively wide, so a large R-C value (such as about 1 µs) is needed so that n-channel clamp transistor 18 does not turn off before the end of the HBM ESD pulse. This large R-C value results is a large size for capacitor 22. Leakage and false triggering can be a problem with the large capacitor.

Capacitor 22 may have a value of around 10 pF. The circuit of FIG. 1 may require an area of 12,000 µm$^2$ for a 0.35-µm CMOS process. Feedback, bistable elements, and thrysistors have been used to solve the large capacitor problem of FIG. 1. However, improved feedback circuits are still desirable.

What is desired is an ESD-protection circuit that protects the internal power supplies of an IC. An active rather than a passive protection circuit is desired. It is desired to actively enable or disable the ESD-protection circuit. It is desired to actively enable and disable a thin-oxide transistor as an ESD shunt between power and ground rings. It is desired to avoid thick-oxide transistors and diodes. An active ESD-protection circuit that is insensitive to noise during power up is desired. An ESD-protection circuit with improved feedback is desired to reduce the size of the capacitor.

BRIEF DESCRIPTION OF THE DRAWINGS

FIG. 6A is a current waveform of a HBM ESD input.

FIG. 6B shows voltage waveforms of nodes of the circuit of FIG. 2 when the HBM current pulse of FIG. 6A is applied to power.

FIGS. 7A-C simulate leakage when Vdd is powered on using a slow rise in Vdd.

FIGS. 8A-C simulate leakage when Vdd is powered on using a fast rise in Vdd.

FIGS. 9A-D are waveforms simulating leakage with glitches on VDD.

DETAILED DESCRIPTION

The present invention relates to an improvement in ESD protection circuits. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that feedback can extend the time that the n-channel clamp transistor remains on, thus allowing a smaller capacitor to be used. The inventors have also realized that sub-threshold conduction can be used to further extend the turn-on time. Since sub-threshold currents are small, discharge times can be extended significantly.

Figure 2:
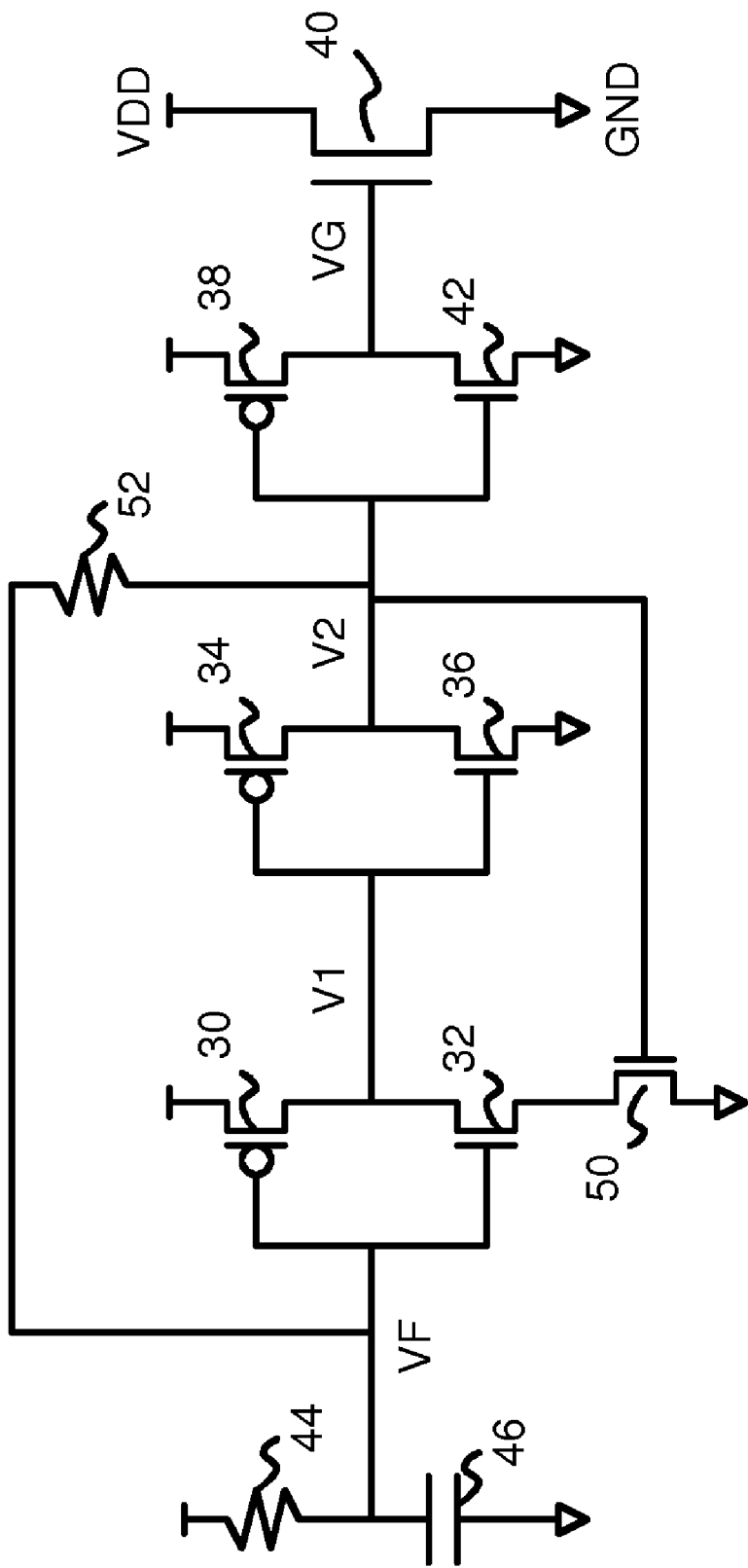
FIG. 2 is a schematic diagram of an NMOS feedback active ESD clamp.

FIG. 2 is a schematic diagram of a sub-threshold feedback active ESD clamp. Filter resistor 44 and filter capacitor 46 are in series between power and ground and generate a filter voltage VF on their intersecting node.

P-channel transistor 30 and n-channel transistor 32 invert VF to generate voltage V1. A third transistor is cascaded with transistors 30, 32 in this first stage. Sub-threshold-conducting transistor 50 connects the source of n-channel transistor 32 to ground.

Another inversion is performed by p-channel transistor 34 and n-channel transistor 36, which receive V1 on their gates and generate V2 on their drains. Feed-forward resistor 52 feeds VF forward to V2.

A final inversion is performed by p-channel transistor 38 and n-channel transistor 42, which receive V2 on their gates and generate VG on their drains. VG is the gate voltage on the gate of n-channel clamp transistor 40, which shunts ESD current from power (Vdd or Vcc) to ground (Vss).

Feed-forward resistor 52 acts to pull voltage V2 high when Vdd is powered on or the IC is operating in the normal state, since voltage VF is pulled high by filter resistor 44. If the value of feed-forward resistor 52 were too high, V2 would not be pulled up adequately. However, if the value of feed-forward resistor 52 were too low, the turn-on time of the clamp would be decreased. A value of 2 K-ohm for feed-forward resistor 52 produces good results.

The feedback provided by feed-forward resistor 52 and sub-threshold-conducting transistor 50 extends the period of time that n-channel clamp transistor 40 remains on. Thus a smaller R-C time constant may be used, and filter capacitor 46 may have a smaller value, area, and leakage.

Figure 3:
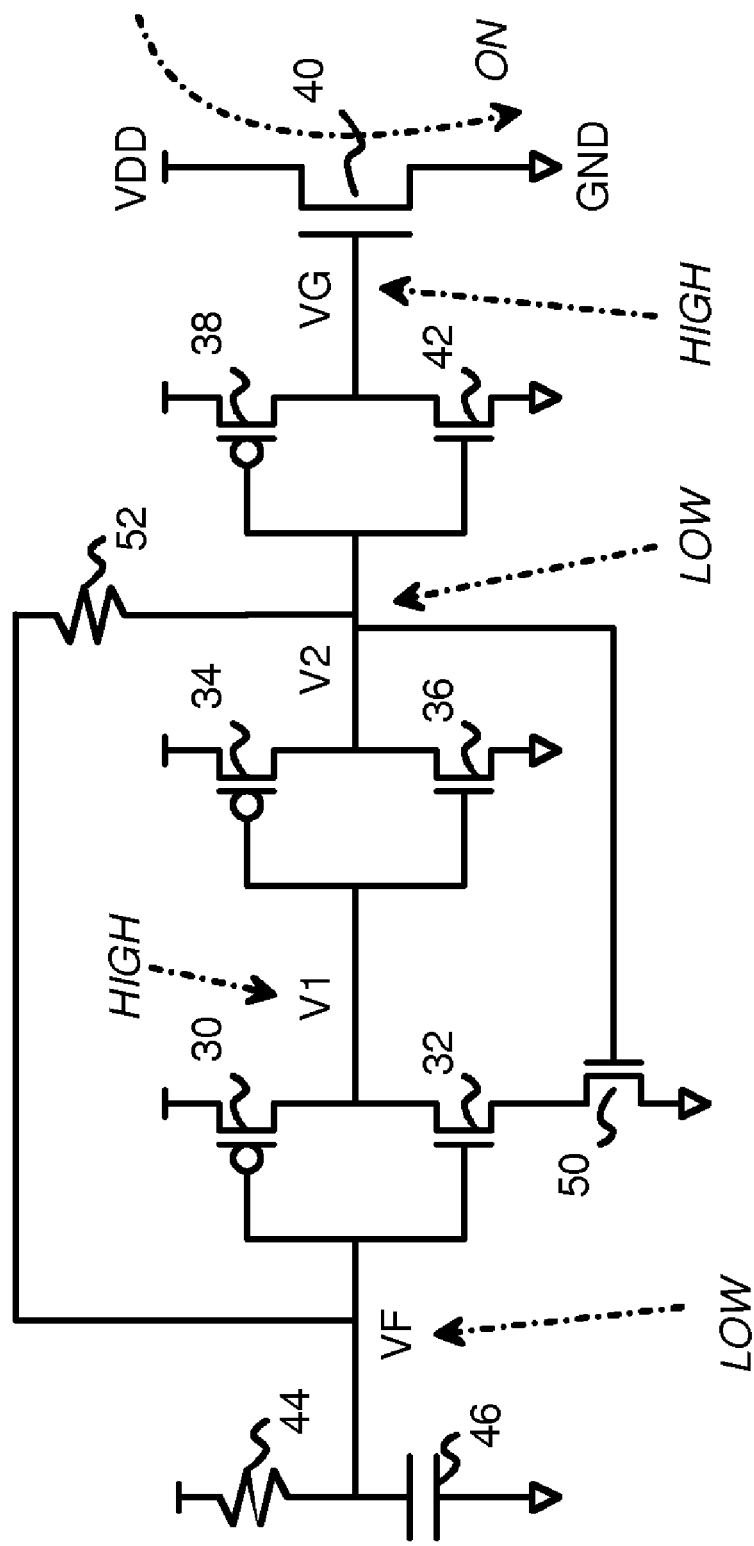
FIG. 3 highlights operation of the NMOS feedback active ESD clamp at the beginning of an ESD event.

FIG. 3 highlights operation of the sub-threshold feedback active ESD clamp at the beginning of an ESD event. When an ESD pulse is quickly applied to power, the internal power voltage rises quickly. However, filter capacitor 46 keeps filter voltage VF relatively low, and the current from power cannot quickly charge VF through filter resistor 44.

The relatively low voltage of VF may be near the nominal power-supply voltage, but it is much less that the power voltage when an ESD pulse is applied to power. For example, the nominal power-supply voltage may be 3.0 volts, and VF remains near 3 volts when an ESD pulse raises power from 3.0 volts to 2000 volts.

The initially low voltage on VF causes p-channel transistor 30 to turn on as its source rises in voltage with the ESD pulse applied to power. P-channel transistor 30 conducts current from power to raise the V1 voltage on its drain.

The high V1 voltage turns on n-channel transistor 36, which drives V2 low to ground. The low voltage on V2 causes p-channel transistor 38 in the third stage to turn on as its source rises in voltage with the ESD pulse applied to power. P-channel transistor 38 conducts current from power to raise the VG voltage on its drain.

The high VG voltage is applied to the gate of n-channel clamp transistor 40. The drain of n-channel clamp transistor 40 is connected to power, but the source of n-channel clamp transistor 40 is connected to ground. Thus n-channel clamp transistor 40 turns on strongly and conducts a large current, shunting the ESD pulse from power to ground.

Both terminals of feed-forward resistor 52 are relatively low. The low on V2 turns off sub-threshold-conducting transistor 50.

Figure 4:
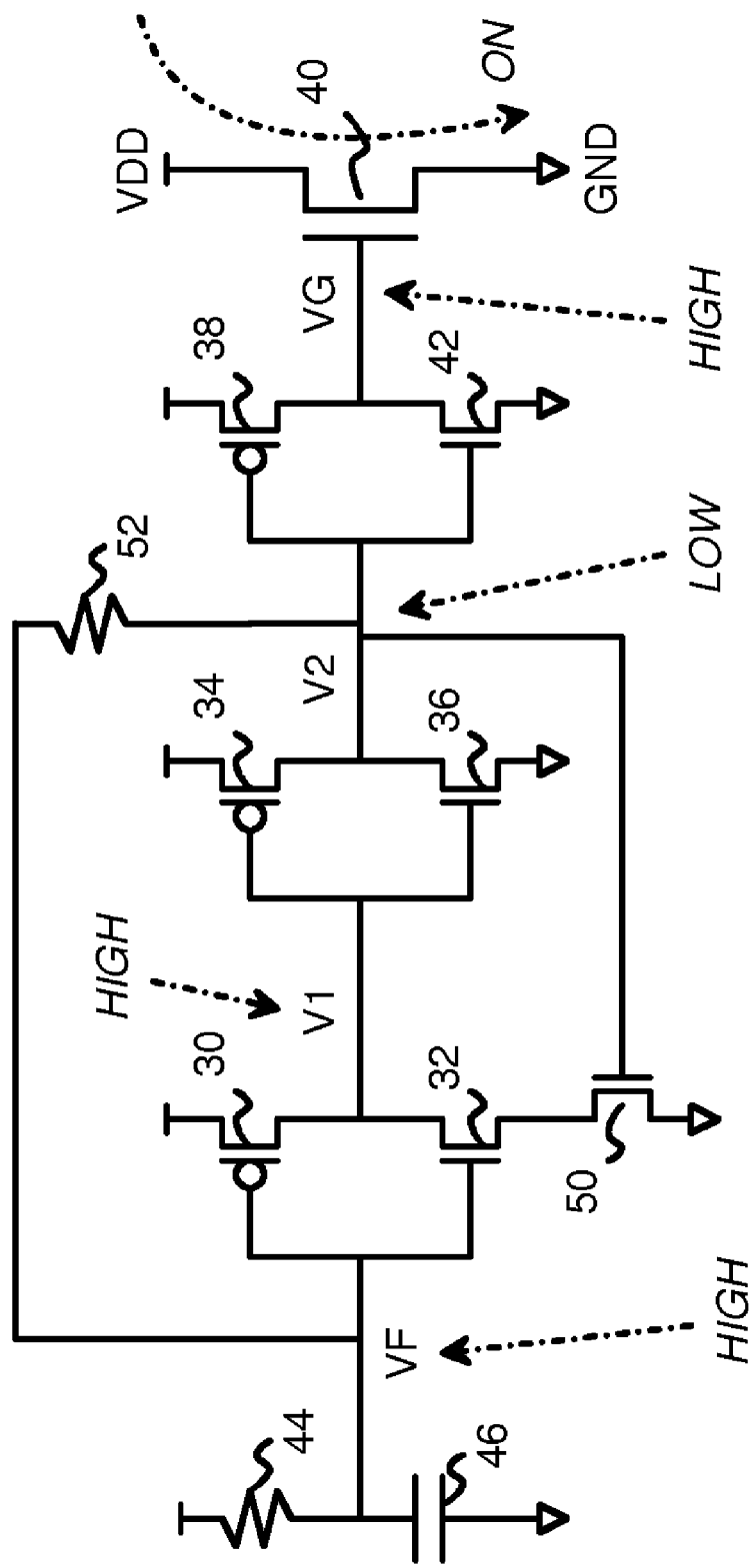
FIG. 4 highlights operation of the NMOS feedback active ESD clamp after the R-C time constant has elapsed after the start of the ESD event.

FIG. 4 highlights operation of the sub-threshold feedback active ESD clamp after the R-C time constant has elapsed after the start of the ESD event. The circuit remains in the initial state described in FIG. 3 for a period of time about equal to the R-C time constant largely determined by the resistance value of filter resistor 44 and the capacitance value of filter capacitor 46.

After the R-C time has elapsed, filter resistor 44 has been able to charge filter capacitor 46 by conducting current from power, so that filter voltage VF rises from low to high. The high voltage VF turns off p-channel transistor 30 so that current is no longer conducted from power to V1. The high voltage VF also turns on n-channel transistor 32. However, n-channel transistor 32 is not directly connected to ground. Sub-threshold-conducting transistor 50 blocks current flow through n-channel transistor 32 since the gate of sub-threshold-conducting transistor 50 is voltage V2, which is still low.

Some charge sharing between the drain and source nodes of n-channel transistor 32 occurs, which can lower drain voltage V1 slightly. However, voltage V1 floats and remains high after the R-C time period has elapsed. The high V1 causes V2 to remain low, which causes VG to remain high. The high VG keeps n-channel clamp transistor 40 turned on, and ESD current continues to be shunted from power to ground.

The terminals of feed-forward resistor 52 are now at different voltages. The high voltage VF feeds forward through feed-forward resistor 52 to slowly raise voltage V2. However, the resistance value of feed-forward resistor 52 causes this charging of V2 to be slowed. During this time, n-channel clamp transistor 40 continues to shunt the ESD current.

As feed-forward resistor 52 raises the V2 voltage, the gate voltage of sub-threshold-conducting transistor 50 also rises above ground, but still below the threshold voltage of sub-threshold-conducting transistor 50. This slight rise in gate voltage allows a sub-threshold current to flow through sub-threshold-conducting transistor 50. Sub-threshold-conducting transistor 50 is an ordinary NMOS transistor, but is used in the circuit specifically for its sub-threshold conduction before the transistor threshold voltage is reached. This sub-threshold current discharges voltage V1 through n-channel transistor 32, which is turned on by the high filter voltage VF.

Figure 5:
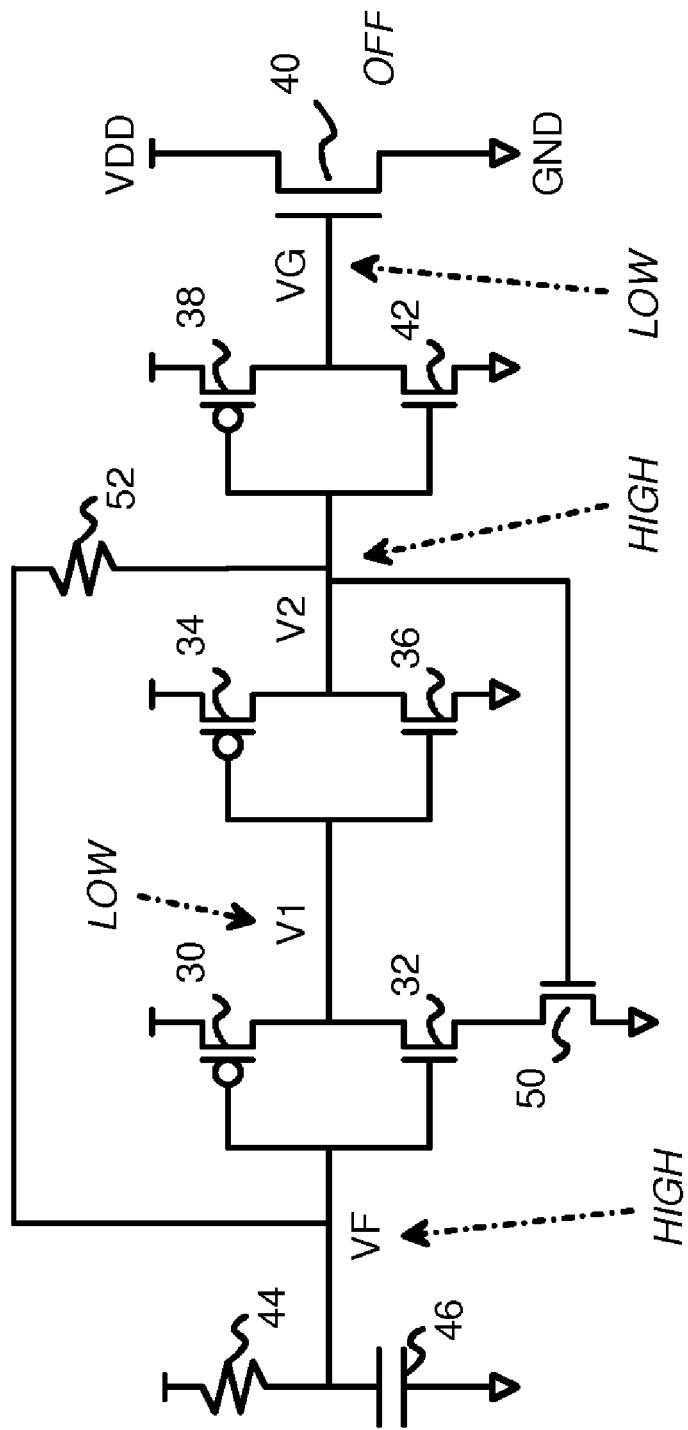
FIG. 5 highlights operation of the NMOS feedback active ESD clamp after the sub-threshold current has discharged V1.

FIG. 5 highlights operation of the sub-threshold feedback active ESD clamp after the sub-threshold current has discharged V1. Eventually, the sub-threshold current through sub-threshold-conducting transistor 50 is able to lower the V1 voltage to below the logic switching threshold of the second stage. P-channel transistor 34 then turns on, and n-channel transistor 36 turns off. Their drains, voltage V2, is actively driven from low to high. The high voltage V2 is applied to the gate of sub-threshold-conducting transistor 50, causing it to turn on strongly and drive voltage V1 even lower to ground.

The high voltage V2 causes p-channel transistor 38 in the third stage to turn off, and n-channel transistor 42 to turn on. Gate voltage VG is driven low to ground. The low VG turns off n-channel clamp transistor 40, and the power-to-ground shunt current stops.

The exact values of the resistors and transistors can be determined by circuit simulation for a particular semiconductor process being used. Simulation can determine values so that the circuit of FIG. 4 remains on long enough to shunt a 2000-volt HBM ESD event.

Figure 1:
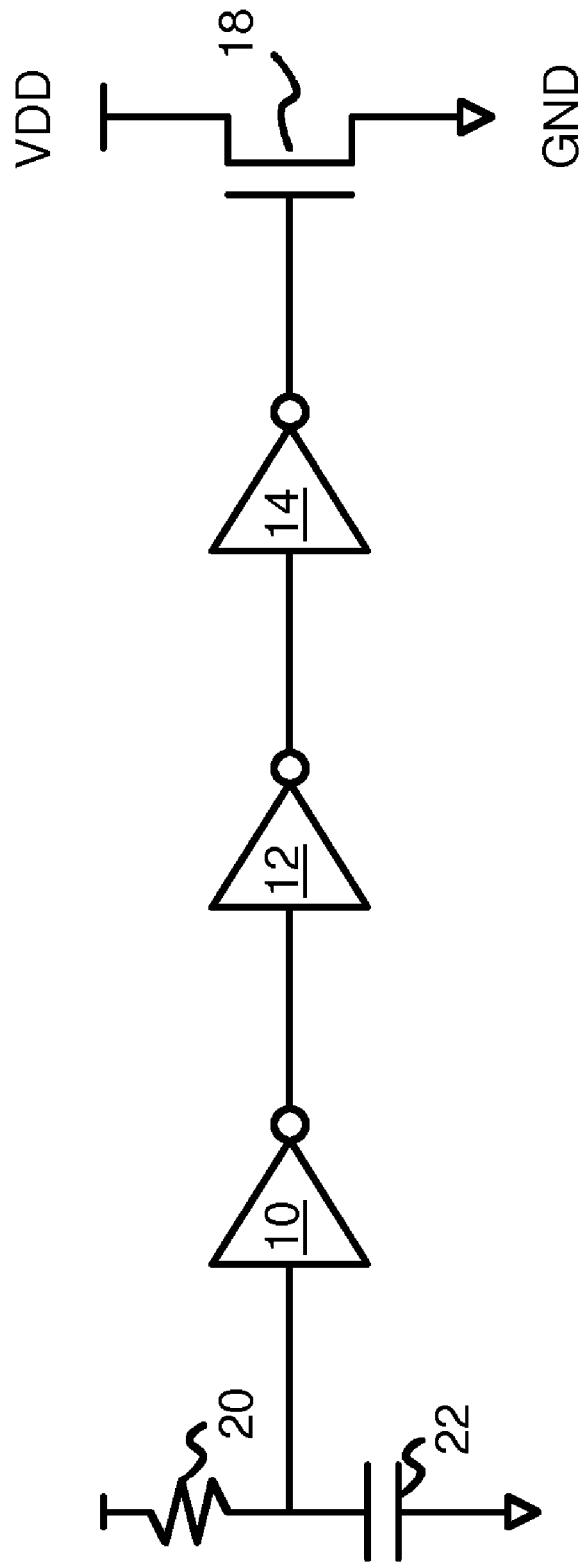
FIG. 1 shows a prior art power-to-ground ESD protection circuit with an active R-C clamp.

For example, when feed-forward resistor 52 is 2K Ohms, and filter resistor 44 is 20 K Ohms, filter capacitor 46 can be 0.5 pF, which is 20 times smaller than the 10 pF needed for prior-art capacitor 22 of FIG. 1. The capacitor area can be reduced from 12,000 $\mu m^2$ to 600 $\mu m^2$ for a 0.35-$\mu m$ CMOS process.

FIG. 6A is a current waveform of a HBM ESD input pulse. The current applied rises suddenly to 1.3 amps in only about 10 ns. The current then decreases over the next 600 ns.

FIG. 6B shows voltage waveforms of nodes of the circuit of FIG. 2 when the HBM current pulse of FIG. 6A is applied to power. The power voltage Vdd quickly rises to about 10 volts in response to the ESD current pulse. The filter voltage VF initially stays low for about 10 ns due to the R-C time constant of the filer, which is about 10 ns (20 K-Ohm×0.5 pF). V1 and VG quickly rise before VF rises, while V2 remains low, although it does initially spike up from ground somewhat. This initial period to about 20 ns corresponds to the beginning of the ESD event shown FIG. 3. The high VG turns on n-channel clamp transistor 40 is strongly, causing Vdd to start falling.

After the R-C time constant of about 10 ns, filter resistor 44 is able to charge filter capacitor 46, raising VF. This occurs at about 20-30 ns in FIG. 6B. Vdd continues to fall, since VG is high and keeps n-channel clamp transistor 40 turned on. As Vdd falls, so does V1 and VG, which are driven from Vdd by p-channel transistors. This corresponds to FIG. 4, after the R-C time elapses.

The sub-threshold current through sub-threshold-conducting transistor 50 slowly discharges V1 over a long period of time, from about 20 ns to 520 ns in FIG. 6B. Eventually this sub-threshold current discharges V1 sufficiently so that V2 switches from low to high, and VG switches from high to low, turning off n-channel clamp transistor 40. However, the HBM current ends before V2 is charged, so this is not visible in FIG. 6B.

Eventually at 520 ns clamp transistor 40 turns off, as V1 and VG are driven low once the sub-threshold current has discharged V1. V2 does not go high in this simulation since the Vdd voltage is so small after 520 ns.

FIGS. 7A-C simulate leakage when Vdd is powered on using a slow rise in Vdd. The power supply Vdd rises from ground to 3.3 volts in 1 millisecond (ms) in the simulation of FIG. 7A. The simulation keeps Vdd at the normal power-supply voltage for another 1 ms before dropping Vdd to ground over another ms.

Leakage current for the circuit of FIG. 2 initially spikes above 5 nA as power rises above ground, FIG. 7B. This initial leakage is due to the sub-threshold leakage of n-channel clamp transistor 40 before the transistor threshold of 750 mV is reached during power on. Leakage drops to zero once Vdd reaches 3.3 volts. As Vdd falls to ground, leakage again occurs and increases as Vdd nears ground.

In FIG. 7C, the gate voltage VG initially is below the transistor threshold voltage, with VG about 75 mV, causing the spike in sub-threshold leakage seen in FIG. 7B. However, as Vdd continues to rise, the gate voltage is driven to ground. The gate voltage VG remains at ground until the circuit is powered off and Vdd nears ground, when the gate voltage VG falls below ground due to capacitive coupling when the n-channel transistors turn off.

FIGS. 8A-C simulate leakage when Vdd is powered on using a fast rise in Vdd. The power supply Vdd rises from ground to 3.3 volts in 10 micro-seconds ($\mu s$) in the simulation of FIG. 8A. The simulation keeps Vdd at the normal power-supply voltage for another 100 $\mu s$ before dropping Vdd to ground over another 10 $\mu s$.

Leakage current for the circuit of FIG. 2 initially spikes above 50 nA as power rises above ground, FIG. 8B. Leakage is ten times larger than in FIG. 7B due to the faster turn on time. This initial leakage is due to the sub-threshold leakage of n-channel clamp transistor 40 before the transistor threshold of 750 mV is reached during power on. Leakage drops to zero once Vdd reaches 3.3 volts. As Vdd falls to ground, leakage again occurs and increases as Vdd nears ground.

In FIG. 8C, the gate voltage VG initially is below the transistor threshold voltage to about 100 mV, causing the spike in leakage seen in FIG. 8B. However, as Vdd continues to rise, the gate voltage is quickly driven to ground. The gate voltage VG remains at ground until the circuit is powered off and Vdd nears ground, when the gate voltage VG is pushed below ground due to capacitive coupling when the n-channel transistors turn off.

FIGS. 9A-D simulate leakage with glitches on VDD. The power supply Vdd rises from ground to 3.3 volts in 1 millisecond (ms) in the simulation of FIG. 9A. The simulation keeps Vdd at the normal power-supply voltage for another 3 ms before dropping Vdd to ground over another ms.

False triggering of ESD protection circuits is a problem. False triggering can be caused by glitches or noise on Vdd. FIG. 9A simulates a low-going glitch on Vdd at 2.8 ms, and another high-going glitch on Vdd at 3.7 ms. The glitches are about 3-4 volts in magnitude.

Leakage current for the circuit of FIG. 2 initially spikes above 50 nA as power rises above ground, FIG. 9B. This initial leakage is due to the sub-threshold leakage of n-channel clamp transistor 40 before the transistor threshold of 750 mV is reached during power on. Leakage drops to zero once Vdd reaches 3.3 volts. As Vdd falls to ground, leakage again occurs and increases as Vdd nears ground.

When the glitches occur on Vdd, large leakage currents occur of about +/−500 nA. The leakage is initially in the direction of the glitch, and then in the opposite direction as the glitch ends.

In FIG. 9C, the gate voltage VG initially is below the transistor threshold voltage, at about 75 mV, causing the small initial spike in leakage seen in FIG. 9B. However, as Vdd continues to rise, the gate voltage is driven to ground. The gate voltage VG remains at ground until the circuit is powered off and Vdd nears ground, when the gate voltage VG falls below ground due to capacitive coupling when the n-channel transistors turn off.

Gate voltage VG does not get disturbed due to the glitches on Vdd. Thus the circuit has an immunity to Vdd glitches. False triggering does not occur. In FIG. 9D, internal node V2 does experience the glitches from Vdd, but these are suppressed before reaching VG.

Alternate Embodiments

Several other embodiments are contemplated by the inventors. For example various transistor technologies may be used rather than standard complementary metal-oxide-semiconductor (CMOS). The clamping transistor can remain activated for at least ten times longer than the R-C time constant. Indeed, FIG. 6B shows the clamp remaining on for about 50 times the 10 ns time constant.

Other implementations of the capacitors and resistors are possible in different process technologies. Longer strings of inverters can be substituted, or more complex gates other than inverters can be used. R-C elements can be added to various nodes, such as nodes within the inverter chain. parasitic resistances and capacitance may also be present. Other transistor technologies may be substituted. Additional filtering or more complex filters may be used. Resistors and capacitors can be implemented in a variety of ways, and can be located under the bonding-pad metal to minimize area. The resistance and capacitance values described herein are examples only and may be varied. Transistor sizes may also vary and inverter stages can be scaled up in size when n-channel clamp transistor 40 is large.

Each inverter stage could be replaced with three inverters, or some other odd number of inverters. Delay lines and buffers could also be added. The terms source and drain are interchangeable, and current be considered to be positive or negative, depending on flow directions and charge.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A protection circuit comprising:
   a clamping transistor, coupled to shunt current from an electrostatic discharge (ESD) pulse applied to an ESD node, having a control gate coupled to a gate node;
   a filter capacitor coupled to a filter node;
   a filter resistor coupled to the filter node;
   a first inversion stage, receiving the filter node as an input, and driving a first node as an output;
   a second inversion stage, receiving the first node as an input, and driving a second node as an output;
   a third inversion stage, receiving the second node as an input, and driving the gate node as an output;
   a feed-forward resistor coupled between the filter node and the second node, for extending the charging time of the second node during the ESD pulse; and
   a sub-threshold-conducting transistor, in the first inversion stage, and receiving the second node on a control gate, for limiting a first current to the first node through the first inversion stage during the ESD pulse,
   whereby the clamping transistor remains on while the sub-threshold-conducting transistor conducts sub-threshold current.

2. The protection circuit of claim 1 wherein the first current is limited to sub-threshold current before the feed-forward resistor charges the second node above a threshold voltage of the sub-threshold-conducting transistor,
   whereby sub-threshold current extends a duration of activation of the clamping transistor.

3. The protection circuit of claim 2 wherein the filter capacitor has a filter capacitance value;
   wherein the filter resistor has a filter resistance value;
   wherein an R-C time constant is the filter capacitance value multiplied by the filter resistance value;
   wherein the clamping transistor remains activated for at least ten times longer than the R-C time constant.

4. The protection circuit of claim 3 wherein the clamping transistor remains activated for at least fifty times longer than the R-C time constant,
   whereby the sub-threshold-conducting transistor extends a discharge time that the clamping transistor is shunting current during the ESD pulse.

5. The protection circuit of claim 2 wherein the filter resistor is connected between the ESD node and the filter node.

6. The protection circuit of claim 5 wherein the filter capacitor is connected between the filter node and a ground.

7. The protection circuit of claim 6 wherein the first inversion stage comprises:
   a first transistor having a gate receiving the filter node, for conducting current between the ESD node and the first node;
   a second transistor having a gate receiving the filter node, for conducting current between a limiting node and the first node;
   wherein the sub-threshold-conducting transistor conducts sub-threshold current between the limiting node and the ground in response to the second node applied as the control gate,
   whereby current is limited in the first inversion stage.

8. The protection circuit of claim 7 wherein the second inversion stage comprises and inverter;
   wherein the third inversion stage comprises an inverter.

9. The protection circuit of claim 8 wherein the sub-threshold-conducting transistor is an n-channel transistor having a source connected to the ground.

10. The protection circuit of claim 9 wherein the second transistor is an n-channel transistor having a drain connected to the first node and a source connected to the limiting node;
    wherein the first transistor is a p-channel transistor having a source connected to the ESD node.

11. The protection circuit of claim 10 wherein the clamping transistor is an n-channel transistor having a source connected to the ground.

12. The protection circuit of claim 11 wherein the clamping transistor has a drain coupled to a power supply, and a source coupled to the ground;
    wherein the ESD node is the power supply;

whereby the clamping transistor shunts current from power to ground when the ESD pulse is applied from a power pin to a ground pin.

13. A Vdd-to-Vss electrostatic discharge (ESD) protection circuit comprising:
   a Vdd power supply;
   a Vss ground supply;
   a filter coupled between the Vdd power supply and the Vss ground supply, for generating a filter voltage on a filter node;
   a chain of inverters, receiving the filter voltage as an input, for generating a control node as an output, the chain of inverters including a limiting inverter and an intermediate node after the limiting inverter;
   a feed-forward resistor coupled between the filter node and the intermediate node, the feed-forward resistor extending the charging time of the intermediate node during an ESD pulse coupled through the filter;
   a clamping transistor, having a channel for conducting current from the Vdd power supply to the Vss ground supply in response to the control node; and
   a sub-threshold-conducting transistor, in the limiting inverter and receiving the intermediate node as a gate, having a channel for conducting current from a limiting node to the Vss ground supply in response to the intermediate node,
   whereby the sub-threshold-conducting transistor limits current in the limiting inverter in the chain of inverters to extend a discharge time through the clamping transistor.

14. The Vdd-to-Vss ESD protection circuit of claim 13 wherein the filter comprises a filter resistor and a filter capacitor connected in series between the Vdd power supply and the Vss ground supply.

15. The Vdd-to-Vss ESD protection circuit of claim 14 wherein the chain of inverters comprises an odd number of inverting stages.

16. The Vdd-to-Vss ESD protection circuit of claim 14 wherein the clamping transistor and the sub-threshold-conducting transistor are n-channel metal-oxide-semiconductor (MOS) transistors.

17. The Vdd-to-Vss ESD protection circuit of claim 16 wherein the clamping transistor and the sub-threshold-conducting transistor have sources connected to the Vss ground supply.

18. Vdd-to-Vss ESD protection circuit of claim 13 wherein the chain of inverters comprises:
   the limiting inverter, receiving the filter node, for outputting a first node;
   a second inverter, receiving the first node, for driving the intermediate node; and
   a third inverter, receiving the intermediate node, for driving the control node.

19. Vdd-to-Vss ESD protection circuit of claim 18 wherein the limiting inverter further comprises:
   a p-channel transistor having a gate receiving the filter node and a drain driving the first node and a source connected to the Vdd power supply;
   an n-channel transistor having a gate receiving the filter node and a drain driving the first node and a source connected to the limiting node;
   the sub-threshold-conducting transistor having a gate receiving the intermediate node, a source connected to the Vss ground supply, and a drain connected to the limiting node.

20. A core protection device for protecting core transistors from electrostatic discharge (ESD) pulses comprising:
   a clamping n-channel transistor, having a drain coupled to a power supply bus, a source coupled to a ground bus, and a gate coupled to a control node, for shunting current during ESD pulses;
   a final inverter receiving a second node, for outputting the control node;
   at least one intermediate inverter, receiving a first node, for outputting to the second node;
   a limiting pull-up transistor, having a gate receiving a filter node, a drain driving the first node, and a source coupled to the power supply bus;
   a limiting pull-down transistor, having a gate receiving the filter node, a drain driving the first node, and a source coupled to a limiting node;
   a sub-threshold-conducting transistor, having a drain coupled to the limiting node, a source coupled to the ground bus, and a gate coupled to the second node, for extending discharge time when the clamping n-channel transistor is turned on during the ESD pulses;
   a filter resistor, coupled between the power supply bus and the filter node;
   a filter capacitor, coupled between the filter node and the ground bus; and
   a feed-forward resistor coupled between the filter node and the second node, the feed-forward resistor extending the charging time of the second node during ESD pulses.

* * * * *